US006788751B1

United States Patent
Hustig et al.

(10) Patent No.: US 6,788,751 B1
(45) Date of Patent: Sep. 7, 2004

(54) FREQUENCY DIVERSITY DIGITAL WIRELESS SYSTEM

(75) Inventors: Charles H. Hustig, Woodland Park, CO (US); Donald W. Moses, 1590 Murphy Pkwy., Eagan, MN (US) 55122

(73) Assignee: Donald W. Moses, Eagan, MN (US)

( * ) Notice: Subject to any disclaimer, the term of this patent is extended or adjusted under 35 U.S.C. 154(b) by 0 days.

(21) Appl. No.: 09/552,471

(22) Filed: Apr. 18, 2000

Related U.S. Application Data

(60) Provisional application No. 60/167,455, filed on Nov. 24, 1999.

(51) Int. Cl.[7] .................................................. H04B 7/04
(52) U.S. Cl. ...................................................... 375/347
(58) Field of Search ................................ 375/347, 146, 375/239, 259, 295

(56) References Cited

U.S. PATENT DOCUMENTS

| | | | | |
|---|---|---|---|---|
| 5,214,678 A | * | 5/1993 | Rault et al. | 375/240 |
| 5,485,215 A | * | 1/1996 | Meyer et al. | 348/423.1 |
| 5,544,167 A | * | 8/1996 | Lucas et al. | 370/342 |
| 5,960,032 A | * | 9/1999 | Letaief et al. | 375/146 |

* cited by examiner

*Primary Examiner*—Stephen Chin
*Assistant Examiner*—Lawrence Williams
(74) *Attorney, Agent, or Firm*—Haynes and Boone, LLP

(57) ABSTRACT

A frequency diversity digital wireless transmission system and method according to which a number of relatively narrow bands are established, each using multiple averaging interpolators. The serial data bits are divided by a predetermined pattern among the frequency bands providing frequency diversity. In response to one or more of the bands being lost to multipath fading or interference, the interpolated signals of the remaining bands are used.

13 Claims, 1 Drawing Sheet

FREQUENCY DIVERSITY DIGITAL WIRELESS SYSTEM

CROSS REFERENCE TO RELATED APPLICATION

This application claims the benefit of U.S. Provisional Patent Application Serial No. 60/167,455, filed Nov. 24, 1999.

BACKGROUND

The field of the invention relates generally to digital wireless communication, and more specifically, the transmission of digital audio and video data by means of a wireless connection.

Conventional methods of transmitting data place digital data in the form of QAM, QPSK, FSK or other coding scheme within a frequency band. The higher the data rate, the wider the bandwidth of the frequency band. Relatively, wide bands have the problem of frequency selective multipath fading and in-band interference. To avoid this problem, many systems utilize spread spectrum frequency hopping or direct sequence techniques. Spread spectrum schemes are effective, but require a large processing gain and therefore are limited as to data through-put. They are also too expensive for many high data rate consumer applications.

Therefore, what is needed is an invention that is an inexpensive alternative to transmit wireless digital audio and video data. Also what is needed is an invention that can transmit the wireless data and not be unduly limited as to data through-put.

SUMMARY

In contrast to the prior art, the present invention provides an inexpensive method for transmitting wireless digital audio and video data, while maintaining a high data through-put. To this end, in one embodiment the method utilizes a plurality of relatively narrow bands as opposed to one wider one. This minimizes the negative impact of frequency selective multipath fading and in-band interference. The serial data bits are divided by some predetermined pattern among the frequency bands providing frequency diversity. As one or more of the bands are lost to multipath fading or interference, the interpolated signals of the remaining bands are used.

An inexpensive implementation can use multiple averaging interpolators on each band to be summed or selected in a multiplexer to give the output signal.

A second implementation can have the data output of all bands applied to an interpolation filter curve in a Digital Signal Processor (DSP). An interpolation filter allows part of the received data to be lost without great harm because one can fall back to interpolation of the "good" data.

Therefore, in accordance with the previous summary, objects, features and advantages of the present invention will become apparent to one skilled in the art from the subsequent description and the appended claims taken in conjunction with the accompanying drawings.

DETAILED DESCRIPTION

The present invention can be described with several examples given below. It is understood, however, that the examples below are not necessarily limitations to the present invention, but are used to describe typical embodiments of operation.

Figure 1:
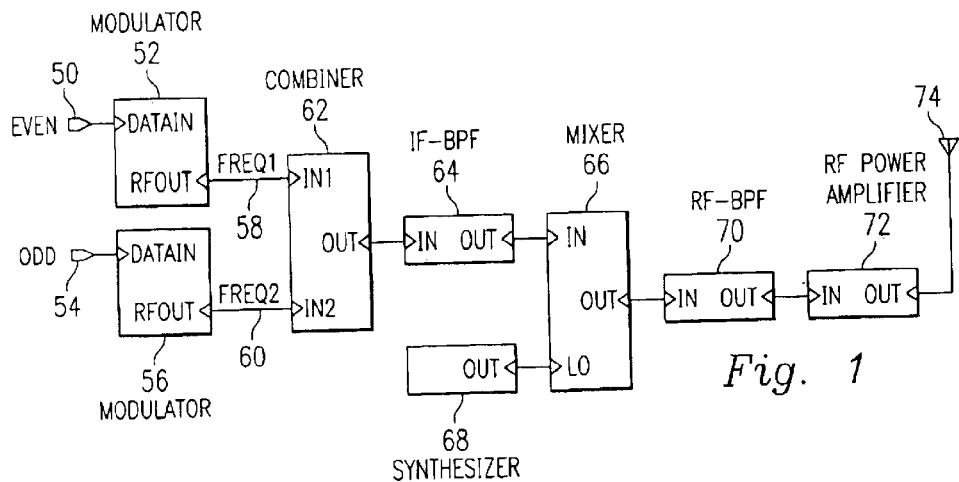
FIG. 1 is a schematic diagram of a transmitter according to an embodiment of the present invention.
Figure 2:
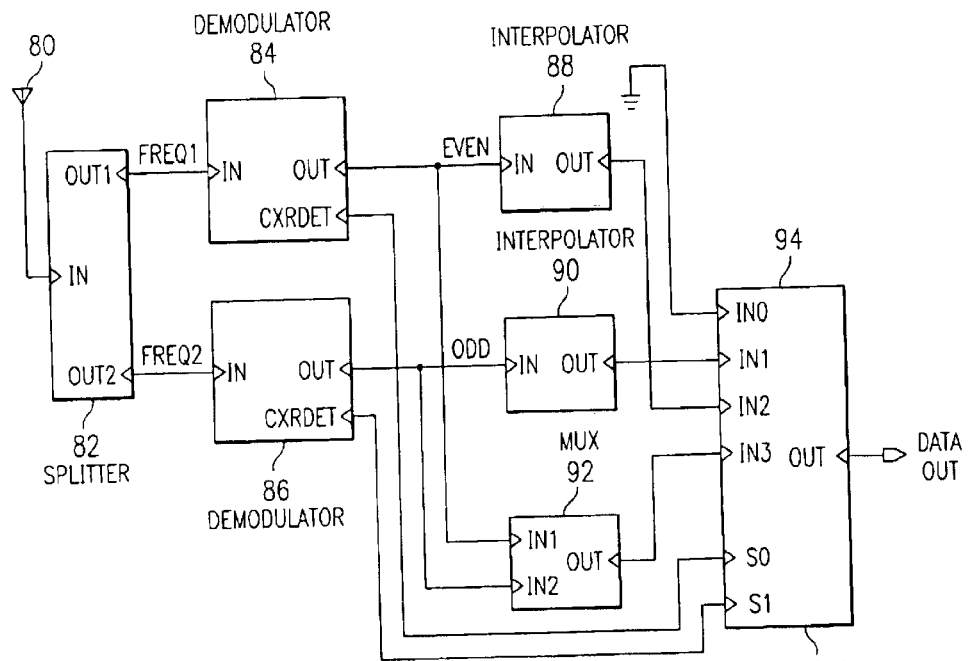
FIG. 2 is a schematic diagram of a receiver according to an embodiment of the present invention.

In the example shown in FIGS. 1 and 2, n=2 and the data bit stream is divided into even and odd samples. These samples have been scrambled with a pseudo-random code and in some cases coded with a forward error correcting algorithm.

With reference to FIG. 1, the even samples 50 are minimal shift key (MSK) modulated by MSK_MODULATOR 52 and the odd samples 54 are modulated by MSK_MODULATOR 56. The samples are modulated into two Intermediate Frequency (IF) frequencies, one 58 for the even samples and one 60 for the odd samples. The resulting modulated signals are termed FREQ1 58 and FREQ2 60. In the general case, the modulated signals would be FREQ1 through FREQn.

The modulated signals are combined in a COMBINER 62 and applied to an IF band pass filter (IF-BPF) 64. A MIXER 66 multiplies the IF signal with the output of a Radio Frequency (RF) SYNTHESIZER 68 translating the signals to the desired HF (up to 54 MHz), VHF (54–470 MHz), UHF (470 MHz–1 gigaHz) or microwave frequency band as selected by the RF band pass filter (RF_BPF) 70.

A linear RF power amplifier 72 boosts the signal to the desired level (e.g. 100-mW) for transmission. This signal is then transmitted through the transmit antenna 74.

Referring now to FIG. 2, the receive antenna signal 80 is connected by means of a SPLITTER 82 to a n-number (in this case n=2) of MSK demodulators 84, 86 (MSK-RCVR-DEMOD). The demodulators 84, 86 decode the MSK data, unscramble and, in some cases, decode the forward error correction algorithm.

In the present example, the demodulated outputs are fed to INTERPOLATORs 88, 90 which add successive samples and then divides by n (in this case n=2), to compute the running average. A MUX 92 is also used to combine the even and odd signals into one complete signal. The four to one multiplexer (M4_1) 94 chooses between four options as controlled by the even and odd carrier detect control signals (CXRDET).

The preferred option is input 3 (IN3) which is the combined even and odd signal from the MUX 92. If one of the two MSK signals is corrupted as indicated by a logic 0 on the corresponding CXRDET control signal, then the M4_1 94 selects the interpolated signal of the noncorrupted MSK signal (from the respective INTERPOLATORs 88, 90). If both MSK signals are corrupted, then the M4_1 94 chooses IN0, which is a mute condition.

In order to obtain the narrowest frequency bands possible, multilevel (e.g. Quadrature) minimal shift keying (MSK) or (phase shift keying) (PSK) could be used. A first embodiment utilizes partial response coding and transmits a digital audio signal for one channel. The signal at 1.152 Mbps (16 samples X 48-kHz sampling rate) will be split into two 576 kbps even and odd signals. These signals are then scrambled by means of a psuedo random code with the transmission bandwidth at 288-kHz.

The IF filters can be SAW filters at almost any convenient IF frequency. However, cost can be saved by using a 360-kHz 10.7-MHZ ceramic filter developed for FM radios. Frame synchronization uses bit 24, alternating 1,0 for synchronization.

The intended applications of the above include, but are not limited to: the transmission of digital audio and video data on a wireless LAN within a home, recording studio or concert venue; and the transmission of digital audio and/or digital video information within a home theater venue.

It is understood that several modifications, changes and substitutions are intended in the foregoing disclosure and in some instances some features of the invention will be employed without a corresponding use of other features. For example, in an alternate embodiment the outputs of the demodulators are fed to a DSP and applied to an interpolation curve. Accordingly, it is appropriate that the appended claims be construed broadly and in a manner consistent with the scope of the invention.

What is claimed is:

1. A communication method for a frequency diversity digital wireless system, the method comprising:

establishing a plurality of narrow bands, each narrow band using a plurality of averaging interpolators;

dividing serial data bits by a predetermined pattern among the narrow bands providing frequency diversity; and responding to one or more of the narrow bands being lost to multipath fading or interference and using the interpolated signals of the remaining narrow bands.

2. The method of claim 1 further including selecting a plurality of averaging interpolators on each narrow band in a multiplexer to result in an output signal.

3. The method of claim 1 further including applying data output of all narrow bands to an interpolation filter curve in a digital signal processor.

4. The method of claim 1 wherein the establishing of the narrow bands utilizes minimal shift keying.

5. The method of claim 1 wherein the establishing of the narrow bands utilizes phase shift keying.

6. A system of transmitting and receiving a frequency diversity digital wireless signal, the system comprising:

means for establishing a number of relatively narrow bands, each using a plurality of averaging interpolators;

means for dividing serial data bits by a predetermined pattern among the narrow bands providing frequency diversity; and means for responding to one or more of the narrow bands being lost to multipath fading or interference and using interpolated signals of the remaining narrow bands.

7. The system of claim 6 further including means for selecting a plurality of averaging interpolators on each narrow band in a multiplexer to give an output signal.

8. The system of claim 6 further including means for applying data output of all narrow bands to an interpolation filter curve in a digital signal processor.

9. The system of claim 6 wherein the establishing of the narrow bands utilizes minimal shift keying.

10. The system of claim 6 wherein the establishing of the narrow bands utilizes phase shift keying.

11. A computer-readable medium having computer-executable instructions for a frequency diversity digital wireless system, the instructions comprising:

instructions for establishing a plurality of narrow band, each narrow band using a plurality of averaging interpolators;

instructions for dividing serial data bits by a predetermined pattern among the narrow bands providing frequency diversity; and instructions for responding to one or more of the narrow bands being lost to multipath fading or interference and using the interpolated signals of the remaining narrow bands.

12. The computer-readable medium of claim 11 further including instructions for selecting a plurality of averaging interpolators on each narrow band in a multiplexer to result in output signal.

13. The computer-readable medium of claim 11 further including instructions for applying data output of all narrow bands to an interpolation filter curve in a digital signal processor.

* * * * *